June 12, 1956  R. DE LA TRAMERYE  2,749,949
FLEXIBLE SPIRAL TWISTED SAW
Filed June 22, 1953  2 Sheets-Sheet 1
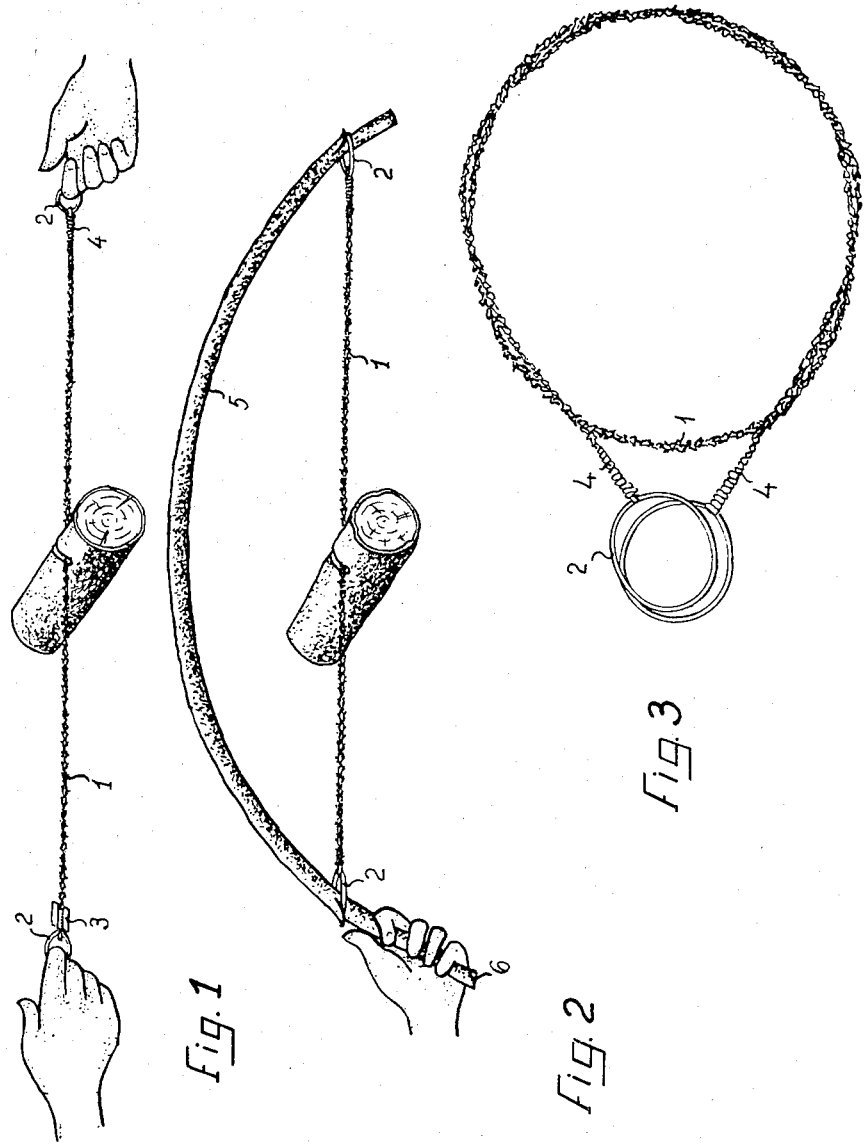
Inventor
R. de la Tramerye

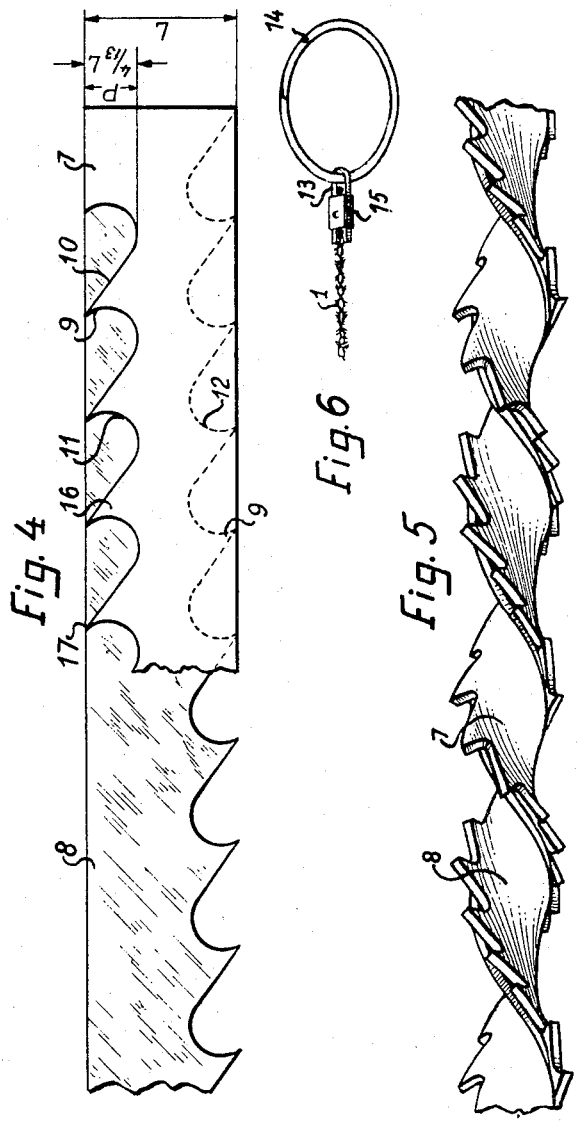

United States Patent Office 2,749,949
Patented June 12, 1956

2,749,949

FLEXIBLE SPIRAL TWISTED SAW

Raymond de la Tramerye, Paris, France, assignor to Societe Anonyme Tubest, Paris, France, a French company Application June 22, 1953, Serial No. 363,002

Claims priority, application France June 28, 1952

7 Claims. (Cl. 143—133)

My invention relates to sawing devices and has for an object, to provide a pocket saw suited for cutting down trees, sawing logs and the like, as well as plastics, bones, ivory, plaster, soft stones, etc.

Another object of my invention is to provide a saw which, though very efficient, is of a comparatively small diameter and possesses a high degree of flexibility which makes it possible, for said saw, to be rolled up and carried in one's pocket under an extremely reduced volume.

A further object of my invention is to provide a saw capable of cutting action in both directions of the reciprocating movement imparted thereto, while avoiding risks of clogging during the sawing operations due to the easy escape of saw-dust from the kerf being cut thereby.

Still another object of my invention is to provide a pocket saw fitted, at its extremities, with holding means having the shape of annular members, so as to permit the manipulation of the saw, both, by fingers introduced in these annular members, or by a flexible piece of wood introduced in said annular members and forming an operating and supporting bow-shaped member.

Another object of my invention is to provide a flexible pocket saw which may be formed by twisting together two similar longitudinal members constituted, each by a thin strip of steel band having one of its longitudinal edges formed with a row of saw-teeth, said two strips being held together by twisting and the extremities of the saw being provided with holding and manipulating members maintaining, furthermore, said strips bound together.

A still further object of my invention relates to a saw of the type specified having teeth so dimensioned in respect to the total width of the strip and a pitch of twisting so dimensioned in respect to said width that the cutting teeth radiate in all directions while being supported along a part of their height by the plane edge of the cooperating strip.

Still a further object of my invention is to give to the teeth of the two cooperating thin strips of metal band such a shape that the two strips be twisted together without any risk of rupture of the strips starting in the recesses between the teeth.

With these and other objects in view, the invention will now be described with reference to the accompanying drawings wherein:

Fig. 1 shows the saw being operated without the help of any supporting member.

Fig. 2 shows a saw adapted to a removable supporting member for single hand operation.

Fig. 3 shows the saw rolled together for carrying purpose.

Fig. 4 show, on a larger scale, with some portions being cut away, the shape and arrangement of the two blades the saw is made of.

Fig. 5 is a perspective view also on a larger scale showing a portion of the saw in its final twisted state and Fig. 6 illustrates a removable ring attached to one end of the saw.

Referring to the drawings, 1 shows a wire constituted by two thin strips of steel band identical in shape, having one of their longitudinal edges formed with a row of inclined saw-teeth and twisted together, said strips being juxtaposed before twisting, so that the rear edge portions of their respective teeth extend in opposite directions and so that the roots of the teeth of one strip are supported by the untoothed edge of the other strip. Thus, the saw cuts in both directions, while the helical disposition of the teeth around the periphery of the saw, ensures an easy escape of sawdust from the kerf being cut by the saw. The two thin strips of steel band are held in the twisted position at both ends by a thin metal wire, as shown at 4 on the right-hand end of Fig. 1, or by means of a tubular section 3 crushed against the wire, as shown on the left hand end of Fig. 1. In the example shown in Fig. 1, the holding and manipulating means are constituted by annular members 2, the same being attached to the ends of the wire 1, preferably by the above-mentioned holding elements such as 3 or 4.

It must be, however, well understood that the strips may be held together in any other suitable means, without departing from the scope of my invention, while the shape and the means of attachment of the holding members, such as 2, may also be modified.

In Fig. 2 is shown another use of the saw according to my invention; in this instance, a twig 5 is engaged into the two annular members 2, so as to form a bow-shaped support which holds the flexible wire in taut condition. It is thus possible to use the saw in the usual manner, by holding the end 6 of the twig and using a single hand.

Fig. 3 illustrates how the saw may be rolled-up for carrying purposes. I particularly intend to manufacture saws having a diameter of the order of 0.06 inch and about 1'/8'' long. A saw of these dimensions may be rolled-up, as shown in Fig. 4, and dispatched in a mail envelope or carried in a pocket without difficulty. In fact, its overall dimensions, above-mentioned, and its weight (about 1.6 oz.) are practically negligible.

Referring now to Fig. 4, I have illustrated the manner in which my saw is manufactured. The two thin steel strips constituting the saw are shown in this figure before twisting. These two strips 7 and 8, respectively, are similar and are provided, each along one of its edges, with inclined saw-teeth 9. When the two strips are laid on each other before twisting, the smooth edge of one strip over-lays the toothed edge of the other, as shown. The teeth 9 of the two strips are oppositely inclined so as to ensure sawing in both directions. The teeth 9 have a particular shape and dimensions to enable easy and reliable manufacturing of the saw, good sawing effect and a facility of rolling up and folding the wire e. g. for storage purposes. As shown in Fig. 4, each tooth comprises, respectively, a linear rear edge portion 10 inclined with respect to the longitudinal axis of the corresponding strip, a front edge portion 11 substantially normal to said axis and an arcuate edge portion 12 joining said front edge portion with the rear edge portion of the next following tooth. With this arrangement, when the two strips are twisted together, the danger of a rupture of the strips is avoided, due to the arcuate part 12, while the teeth present a strong root portion 16 and a sharp inclined cutting edge 17 that ensures proper sawing.

According to another feature of the invention, the height $p$ of the teeth, in respect to the overall width L of the strips, is comprised between $\frac{1}{4}$ to $\frac{1}{2}$ of said overall width L and is preferably equal to $\frac{4}{13}$ of said width.

According to still another feature, the pitch of the twisting is so chosen as to be comprised between two to four times the width of the strip. These two combined features ensure a transversal displacement of the smooth edge of one strip, in respect to the teeth of the other, as the two strips are twisted together, so that when the twisting is completed, the teeth radiate all around the periphery of the saw in all directions, the roots of the teeth of one strip being supported by the smooth edge of the other strip.

Another advantage of choosing this particular pitch is to ensure that the folding of the wire does not produce an effect of separating the two strips, which are held simply by the effect of proper twisting. Very good results have been obtained with 0.01" thick strips and 0.05" wide strips, with a number of twist turns smaller than eight per inch of the saw length.

The general aspect of a portion of my saw may be seen in Fig. 5. It may be seen in this figure that the roots of the teeth of each strip are in bearing engagement with and rest on the smooth part of the other strip.

In the embodiment shown in Fig. 6, a removable ring such as a key-ring 14 is secured to one end of the saw. This ring is engaged in the loop formed by a narrow steel ring 13 bent over the end of the saw 1, a small sleeve 15 being then engaged on the ends of the loop 13 and the extremity of the saw 1 and so clamped as to secure together the two strips of the saw 1 and the two ends of the loop 13.

The provision of a removable ring enables the operator by removing said ring to introduce the bare extremity through a small hole provided, for instance, in a panel, put the ring back in place and then proceed to cutting operations of the desired shape.

It should be furthermore noted that the standard wire manufactured in continuous operation can be cut to required length which allows, by a standardized manufacture, the possibility of obtaining saws of any desired length. The saw according to my invention is preferably made of high resistance alloy steel. This saw is very flexible and supple, while resisting important mechanical stresses. The twisting of the two strips allows a short and rapid cut to be effected, while saw-dust and chips are easily escaped. It may be used for cutting woods of any nature, dried or not, plastics, bone, ivory, plasterer soft stones, ice, sugar heads and even metals.

What is claimed is:

1. A flexible pocket saw, comprising two thin narrow steel strips, each toothed along one edge and substantially of the same length, thickness and width, said strips being twisted together with the untoothed edge of one strip lying against the toothed edge of the other strip in such a manner that the untoothed edge of one strip leaves exposed the points of the teeth of the other strip to laterally support only the root portions thereof, whereby, after twisting, the teeth are distributed over the circumference and substantially the entire length of the saw.

2. A saw according to claim 1, in which the recesses between the successive teeth of each strip have a rounded bottom.

3. A saw according to claim 1, in which the ratio of the height of the teeth to the overall width of the strip lies between ¼ and ½ of said width.

4. A saw according to claim 1, in which the ratio of the height of the teeth to the overall width of the strip is ⅓₁₃ of said width.

5. A saw according to claim 1, in which the pitch of the twist of the two strips is between two and four times the overall width of the strip.

6. A saw according to claim 1, in which the saw teeth are inclined, the teeth of the two strips being oppositely directed.

7. A pocket saw comprising two cooperating thin strips of metal band identical in shape and having one of their longitudinal edges formed with a row of saw-teeth having a height ¼ to ½ of the overall width of said strips, said teeth comprising each a substantially linear rear edge portion inclined with respect to the longitudinal axis of the corresponding strip, a front edge portion substantially normal to said axis and an arcuate edge portion joining said front edge portion with the rear edge portion of the next following tooth, said strips being juxtaposed so that said rear edge portions of their respective teeth extend in opposite directions and so that the roots of the teeth of one strip are supported by the untoothed edge of the other strip, said juxtaposed strips being twisted together with a pitch from two to four times the width thereof to form a single flexible member having said teeth projecting therefrom in an axially and circumferentially spaced relationship, and means mounted at each end of said flexible member to maintain said strips bound together to manipulate the saw.

References Cited in the file of this patent

UNITED STATES PATENTS

| | | |
|---|---|---|
| 486,226 | Hazard | Nov. 15, 1892 |
| 1,954,905 | Wheat | Apr. 17, 1934 |

FOREIGN PATENTS

| | | |
|---|---|---|
| 15,168 | Great Britain | Oct. 22, 1888 |
| 83,541 | Switzerland | Dec. 16, 1919 |